UNITED STATES PATENT OFFICE.

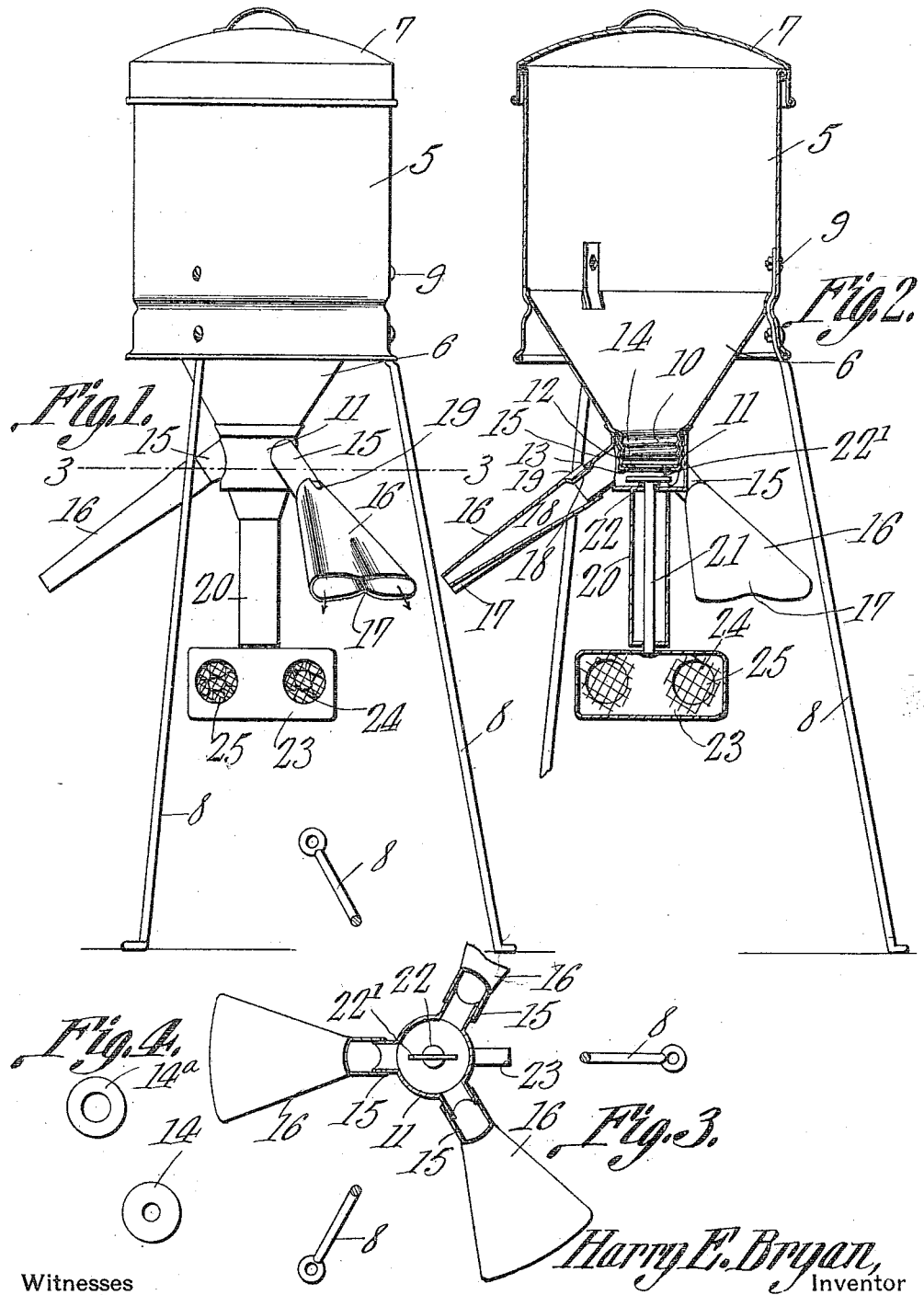

HARRY E. BRYAN, OF CADIZ, OHIO.

POULTRY-FEEDER.

979,421.

Specification of Letters Patent.  Patented Dec. 27, 1910.

Application filed August 9, 1910. Serial No. 576,271.

*To all whom it may concern:*

Be it known that I, HARRY E. BRYAN, a citizen of the United States, residing at Cadiz, in the county of Harrison and State of Ohio, have invented a new and useful Poultry-Feeder, of which the following is a specification.

It is the object of the present invention to provide an improved construction of poultry feeder and the improvements of the present invention are directed more especially to a poultry feeder so constructed as to automatically deliver a certain quantity of feed every time a grain containing member thereof is pecked at by a fowl.

A further aim of the invention is to provide a feeder of this type so arranged that but very little of the weight of the grain rests upon the working elements of the feeder so that the element that is pecked at by the fowl may be readily so moved as to cause discharge of grain.

It is a further aim of the invention to provide means which will positively feed the grain from the hopper of the device and will not permit clogging of the discharge from the hopper.

A still further aim of the invention is to so construct the element at which the fowls peck that they will be induced to strike or peck the same at one or the other of its ends and not at the middle, thereby insuring at least partial rotation of the element each time it is pecked at by a fowl.

Still further the invention aims to provide an extremely simple means for adapting the device for use in distributing corn or smaller grain.

A further feature of the invention resides in the specific form of the discharge spout provided in connection with the feed containing hopper of the device, the spout being so arranged as to scatter the feed to a certain extent so that the feed will not be deposited in a mass or pile but in such manner as to render it necessary that the fowls use some little exertion in eating it.

With the above and other objects in view, the invention resides in the general construction and arrangement of parts shown in the accompanying drawings, in which, Figure 1 is a view in elevation of the device embodying the present invention. Fig. 2 is a vertical sectional view therethrough. Fig. 3 is a horizontal sectional view on the line 3—3 looking downwardly. Fig. 4 is a group view showing the means provided for adapting the device to distribute small or large grain.

In the drawings, the device is illustrated as including, in its structure, a body 5 which may be cylindrical or of any desired form and size and fitted in this body at the lower end thereof is a hopper 6, the point of attachment of the hopper to the body being above the lower end of the body whereby an apron will be afforded extending about the hopper and serving to shed rain water and prevent the same running down the sides of the hopper and on to the operating mechanism of the device to be presently explained. The body 5 is provided with a cover 7 of any suitable form which cover is made either removable or hinged. The hopper 6 and body 5 are supported by suitable legs which are indicated by the numeral 8 and at their upper ends fit between the upper end of the hopper and the lower portion of the body in the manner illustrated in Fig. 2 of the drawings and are secured in place by suitable bolts 9 which may be loosened for the purpose of removing the legs when the device is packed for shipment.

The hopper 6 terminates at its lower end in a threaded reduced portion 10 upon which is fitted a hollow head 11. This head 11 has a collar 12 fixedly arranged therein and having threaded engagement with the portion 10 and the lower end of this collar is spaced above the bottom of the head and formed with a narrow flange 13. Disposed removably upon the flange 13 of the collar 12 is a disk 14 of which there are two shown in Fig. 4 of the drawings, one disk indicated in this figure specifically by the reference character 14$^a$ being formed with an opening of greater diameter than the other disk indicated specifically by the reference character 14$^b$. It will of course be understood that the disk 14$^a$ is better adapted for the passage of large grain than is the disk 14$^b$.

At several points, preferably occurring between the legs 8, the cap 11 is provided with short nipples 15 onto which are fitted the discharge spouts of the device, each of these spouts being substantially triangular when viewed in plan and having their lower ends fitted upon the nipples and their broader ends presented outwardly, the spouts being inclined bodily downwardly.

The spouts 16 are flattened from their upper to their broadened lower ends as is clearly shown in the drawings and are medially compressed or narrowed as at 17 so that grain issuing from the spout will take the general course indicated by the two arrows in Fig. 1 of the drawings, and will be scattered to the proper degree. To prevent rotation of the spout 16 upon the nipple 15, each nipple is formed with an indentation 18 and each spout is formed with a protuberance 19 fitting in the indentation.

Projecting downwardly from the head 11 and axially alined therewith is a sleeve 20 in which is rotatably journaled a shaft 21 provided at its upper end with a head 22 and a stirrer bar 22' secured upon the head and projecting at its ends radially from diametrically opposite points thereon. The lower end of the shaft 21 projects slightly below the lower end of the sleeve 20 and supports a grain box 23 formed with opposed sets of openings 24 covered by wire mesh 25, this box being filled with corn or other coarse grain and serves as a means for inducing the fowls to strike or peck at the box thereby rotating the shaft 21. It will be readily understood that rotation of the shaft will result in the stirrer 22 throwing the grain falling through the openings in the disks 14 from the center in all directions and the grain will consequently fall through the discharge spouts and to the ground. It will be understood at this point that inasmuch as the openings 24 of the grain box are located one set to each side of the axis about which the box rotates, a slight peck at any one of the openings will result in rotation of the box and a consequent rotation of the shaft 21. Also it will be readily understood that while it is extremely unlikely that the device will ever become clogged when the proper sized disk 14 is employed, should this occur and should it be desired to ship the device, the head 11 may be readily unscrewed from the lower end of the hopper and the spouts 16 may be removed from the nipples 15 and these elements may be packed in the body 5 and the hopper 6.

What is claimed is:—

1. In a device of the class described, a container having an outlet, a shaft journaled below the outlet, a grain box carried by the shaft, one end of the shaft being located directly below the outlet, and a stirrer carried by the said end of the shaft, the container having outlets laterally opposite the stirrer.

2. In a device of the class described, a container having an outlet, a head removably fitted upon the container at its outlet, spouts leading radially from the head, a shaft journaled with its upper end projecting into the head, a stirrer carried by the shaft at its said end, and a grain box carried at the lower end of the shaft.

In testimony that I claim the foregoing as my own, I have hereto affixed my signature in the presence of two witnesses.

HARRY E. BRYAN.

Witnesses:
WALTER A. HINES,
C. W. PETTAY.